(12) United States Patent
Van Hove et al.

(10) Patent No.: US 9,895,834 B2
(45) Date of Patent: Feb. 20, 2018

(54) INTEGRALLY BLOW-MOULDED BAG-IN-CONTAINER HAVING INTERFACE VENTS OPENING TO THE ATMOSPHERE AT LOCATION ADJACENT TO BAG'S MOUTH, PREFORM FOR MAKING IT; AND PROCESSES FOR PRODUCING THE PREFORM AND BAG-IN-CONTAINER

(71) Applicant: Anheuser-Busch InBev S.A., Brussels (BE)

(72) Inventors: Sarah Van Hove, Boutersem (BE); Daniel Peirsman, Bornem (BE); Rudi Verpoorten, Lommel (BE)

(73) Assignee: Anheuser-Busch InBev S.A., Brussels (BE)

(*) Notice: Subject to any disclaimer, the term of this patent is extended or adjusted under 35 U.S.C. 154(b) by 403 days.

(21) Appl. No.: 14/552,426

(22) Filed: Nov. 24, 2014

(65) Prior Publication Data
US 2015/0239160 A1    Aug. 27, 2015

Related U.S. Application Data

(60) Division of application No. 12/450,896, filed on May 24, 2010, now Pat. No. 8,931,651, which is a
(Continued)

(51) Int. Cl.
  *B29C 45/16*    (2006.01)
  *B29B 11/14*    (2006.01)
(Continued)

(52) U.S. Cl.
  CPC .......... *B29C 45/1684* (2013.01); *B29B 11/08* (2013.01); *B29B 11/14* (2013.01);
(Continued)

(58) Field of Classification Search
  None
  See application file for complete search history.

(56) References Cited

U.S. PATENT DOCUMENTS 3,285,461 A    11/1966 Santelli
3,450,254 A    6/1969 Miles
(Continued)

FOREIGN PATENT DOCUMENTS

DE    21 15 269    10/1972
EP    0 189 750    8/1986
(Continued)

*Primary Examiner* — Monica Huson
(74) *Attorney, Agent, or Firm* — Levy & Grandinetti

(57) ABSTRACT

The invention is an integrally blow-moulded bag-in-container and preform for making it. The bag-in-container has an inner layer forming the bag and an outer layer forming the container, and a mouth fluidly connecting the volume defined by the bag to the atmosphere. The container further has at least one interface vent fluidly connecting the interface between inner and outer layers to the atmosphere, wherein the at least one vent runs parallel to the interface between inner and outer layers and opens to the atmosphere at a location adjacent to, and oriented coaxially with the bag-in-container's mouth. Processes for manufacturing a preform and a bag-in-container as defined above are defined too.

3 Claims, 2 Drawing Sheets

Related U.S. Application Data continuation of application No. PCT/EP2008/054765, filed on Apr. 18, 2008, which is a continuation-in-part of application No. 11/785,747, filed on Apr. 19, 2007, now abandoned.

(51) Int. Cl.

| | | |
|---|---|---|
| *B29C 49/06* | (2006.01) | |
| *B29C 49/22* | (2006.01) | |
| *B65D 23/02* | (2006.01) | |
| *B65D 83/00* | (2006.01) | |
| *B29B 11/08* | (2006.01) | |
| *B29C 49/00* | (2006.01) | |
| *B29C 35/08* | (2006.01) | |
| *B29K 23/00* | (2006.01) | |
| *B29K 67/00* | (2006.01) | |
| *B29K 77/00* | (2006.01) | |
| *B29K 101/12* | (2006.01) | |
| *B29K 105/00* | (2006.01) | |
| *B29L 9/00* | (2006.01) | |
| *B29L 31/00* | (2006.01) | |

(52) U.S. Cl.
CPC .......... *B29C 49/0073* (2013.01); *B29C 49/06* (2013.01); *B29C 49/22* (2013.01); *B29C 49/221* (2013.01); *B65D 23/02* (2013.01); *B65D 83/0055* (2013.01); *B29B 2911/1408* (2013.01); *B29B 2911/1414* (2013.01); *B29B 2911/1442* (2013.01); *B29B 2911/1444* (2013.01); *B29B 2911/14053* (2013.01); *B29B 2911/14066* (2013.01); *B29B 2911/14093* (2013.01); *B29B 2911/14113* (2013.01); *B29B 2911/14326* (2013.01); *B29B 2911/14333* (2013.01); *B29C 2035/0822* (2013.01); *B29C 2049/0089* (2013.01); *B29C 2049/222* (2013.01); *B29K 2023/06* (2013.01); *B29K 2023/065* (2013.01); *B29K 2023/086* (2013.01); *B29K 2023/12* (2013.01); *B29K 2067/00* (2013.01); *B29K 2067/046* (2013.01); *B29K 2077/00* (2013.01); *B29K 2101/12* (2013.01); *B29K 2105/258* (2013.01); *B29L 2009/00* (2013.01); *B29L 2031/712* (2013.01); *Y10S 215/902* (2013.01)

(56) References Cited

U.S. PATENT DOCUMENTS

| | | | |
|---|---|---|---|
| 3,484,011 A | 12/1969 | Greenhalgh et al. | |
| 4,330,066 A | 5/1982 | Berliner | |
| 4,381,277 A | 4/1983 | Nilsson | |
| 4,865,224 A | 9/1989 | Streck | |
| 4,892,230 A | 1/1990 | Lynn, Jr. | |
| 5,197,602 A | 3/1993 | Biesecker et al. | |
| 5,301,838 A | 4/1994 | Schmidt et al. | |
| 5,407,629 A | 4/1995 | Schmidt et al. | |
| 5,567,377 A | 10/1996 | Nishigami et al. | |
| 5,582,788 A * | 12/1996 | Collette | B29C 45/7207 264/297.2 |
| 5,647,930 A | 7/1997 | Bright | |
| 5,688,570 A * | 11/1997 | Ruttinger, Sr. | B29C 33/42 215/12.2 |
| 5,780,128 A * | 7/1998 | Farha | B29C 49/0005 215/12.2 |
| 5,921,416 A | 7/1999 | Uehara | |
| RE36,410 E | 11/1999 | Meshberg | |
| 6,083,450 A | 7/2000 | Safian | |
| 6,238,201 B1 | 5/2001 | Safian | |
| 6,312,641 B1 * | 11/2001 | Hutchinson | B29C 45/1625 220/62.22 |
| 6,467,653 B1 * | 10/2002 | Hamamoto | A45D 19/02 222/105 |
| 6,503,440 B2 | 1/2003 | Kuehn et al. | |
| 6,641,881 B1 | 11/2003 | Darr | |
| 6,649,121 B1 * | 11/2003 | Hamamoto | B29C 37/0085 264/255 |
| 7,044,334 B2 | 5/2006 | Mita et al. | |
| 7,614,515 B2 | 11/2009 | Furusawa et al. | |
| 8,118,183 B2 | 2/2012 | Iwahashi et al. | |
| 2006/0054635 A1* | 3/2006 | Iwahashi | A61F 9/0008 222/107 |
| 2006/0141189 A1 | 6/2006 | Akiyama et al. | |
| 2012/0132607 A1* | 5/2012 | Landman | B29B 11/14 215/12.1 |

FOREIGN PATENT DOCUMENTS

| | | |
|---|---|---|
| EP | 1 356 915 A1 | 10/2003 |
| EP | 1 547 768 | 6/2005 |
| JP | 05 031791 | 2/1993 |
| JP | 05-213373 | 8/1993 |
| JP | 06 039906 | 2/1994 |
| JP | 08-001761 | 1/1996 |
| JP | 09-208688 | 8/1997 |
| JP | 10-128833 | 5/1998 |
| JP | 10 180853 | 7/1998 |
| JP | 11-010719 | 1/1999 |
| WO | WO 91/08099 | 6/1991 |

* cited by examiner

INTEGRALLY BLOW-MOULDED BAG-IN-CONTAINER HAVING INTERFACE VENTS OPENING TO THE ATMOSPHERE AT LOCATION ADJACENT TO BAG'S MOUTH, PREFORM FOR MAKING IT; AND PROCESSES FOR PRODUCING THE PREFORM AND BAG-IN-CONTAINER

This application is a divisional application of U.S. Ser. No. 12/450,896, filed on May 24, 2010, which was a 35 U.S.C. § 371 national phase conversion of PCT/EP2008/054765, filed on Apr. 18, 2008, which claims priority to U.S. application Ser. No. 11/785,747, filed on Apr. 19, 2007.

FIELD OF THE INVENTION

The present invention relates in general to new developments in dispensing bag-in-containers and, in particular, to the interface vents design which allows control of the pressure at the interface between an inner layer (the bag) and an outer layer (the container) of said bag-in-container, in order to separate the inner layer from the outer layer and collapse the inner bag. It also relates to a method for producing said bag-in-containers and, in particular, to preforms used for their production, as well as a method for producing said preform.

BACKGROUND OF THE INVENTION

Bag-in-containers, also referred to as bag-in-bottles or bag-in-boxes depending on the geometry of the outer vessel, all terms considered herein as being comprised within the meaning of the term bag-in-container, are a family of liquid dispensing packaging consisting of an outer container comprising an opening to the atmosphere—the mouth—and which contains a collapsible inner bag joined to said container and opening to the atmosphere at the region of said mouth. The system must comprise at least one vent fluidly connecting the atmosphere to the region between the inner bag and the outer container in order to control the pressure in said region to squeeze the inner bag and thus dispense the liquid contained therein.

Traditionally, bag-in-containers were—and still are—produced by independently producing an inner hag provided with a specific neck closure assembly and a structural container (usually in the form of a bottle). The bag is inserted into the fully formed bottle opening and fixed thereto by means of the neck closure assembly, which comprises one opening to the interior of the bag and vents fluidly connecting the space between bag and bottle to the atmosphere; examples of such constructions can be found inter alia is U.S. Pat. Nos. 3,484,011, 3,450,254, 4,330,066, and U.S. Pat. No. 4,892,230. These types of bag-in-containers have the advantage of being reusable, but they are very expensive and labour-intensive to produce.

More recent developments focused on the production of "integrally blow-moulded bag-in-containers" thus avoiding the labour-intensive step of assembling the bag into the container, by blow-moulding a polymeric multilayer preform into a container comprising an inner layer and an outer layer, such that the adhesion between the inner and the outer layers of the thus produced container is sufficiently weak to readily delaminate upon introduction of a gas at the interface. The "inner layer" and "outer layer" may each consist of a single layer or a plurality of layers, but can in any case readily be identified, at least upon delamination. Said technology involves many challenges and many alternative solutions were proposed.

The multilayer preform may be extruded or injection moulded (cf. U.S. Pat. No. 6,238,201, JPA 10128833, JPA 11010719, JPA9208688, U.S. Pat. No. 6,649,121). When the former method is advantageous in terms of productivity, the latter is preferable when wall thickness accuracy is required, typically in containers for dispensing beverage.

Preforms for the production of integrally blow-moulded bag-in-containers clearly differ from preforms for the production of blow-moulded co-layered containers, wherein the various layers of the container are not meant to delaminate, in the thickness of the layers. A bag-in-container is comprised of an outer structural envelope containing a flexible, collapsible bag. It follows that the outer layer of the container is substantially thicker than the inner bag. This same relationship can of course be found in the preform as well, which are characterized by an inner layer being substantially thinner than the outer layer. Moreover, in some cases, the preform already comprised vents which are never present in preforms for the production am-layered containers (cf. EPA1356915).

One redundant problem with integrally blow-moulded bag-in-containers is the formation of the interface vents. Several solutions were proposed wherein the vent was formed after the bag-in-container was blow-moulded, as in U.S. Pat. No. 5,301,838, U.S. Pat. No. 5,407,629 JPA5213373, JPA8001761. This approach has of course the disadvantages that it involves an additional production step, and the danger of piercing the bag. Indeed these solutions have in common the formation of a hole normal to the outer containers wall and great accuracy is required not to degrade the inner layer's wall.

In EPA1356915 and U.S. Pat. No. 6,649,121, the preform is formed by injection moulding the outer layer first, followed by injection moulding the inner layer over the outer layer. During injection moulding of the layers, ventilation holes normal to the outer layer's wall are formed with protruding pins, which are flush with the inner surface of the thus obtained outer layer. The over-injected inner layer is not affected by the pins and this method solves the problem associated with the risk of damaging the inner bag during vents formation. The ventilation holes must be positioned close to the region of the container's mouth in an area of no or little stretching during the blow-moulding operation.

The venting holes described in EPA1356915 and U.S. Pat. No. 6,649,121, however, are not suitable for being connected to a source of pressurized gas to three delamination and squeezing of the inner bag. Furthermore, the inner and outer layers are little or not stretched in the region close to the container's mouth resulting in thicker and more rigid wails in this region than in the container's body. Consequently, a higher pressure would be required to delaminate the inner from the outer layers by blowing compressed air through the vents in a direction normal to the interface, as required in bag-in-containers for dispensing beverage like beer and sodas.

JPA10180853 discloses an integrally blow-moulded bag-in-container, wherein the preform consists of an assembly of an inner preform fitted into an outer preform such as to have a cavity transverse to the outer container's wall at a location very close to the preform assembly's mouth. Upon blow-moulding, said vent is maintained in the thus produced bag-in-container. It should be noted that the thickness of the preform's walls disclosed in JPA10180853 varies locally which can lead to serious processing and reproducibility problems of the final bag-in-container upon blow-moulding.

In order to optimize delamination of the inner and outer layers upon blowing pressurized gas into the vents, said vents should preferably run parallel to the interface between the two layers to provide a wedge effect. In the solutions proposed in the prior art relating to integrally blow-moulded bag-in-containers However, the vents run perpendicular to the interface and open to the atmosphere through a hole across, and normal to the outer container's wall, therefore providing no wedge effect and thus reducing the efficacy and reproducibility of the delamination of the inner bag from the outer container.

Bag-in-containers for beverage, like beer or sodas are usually positioned in a specially designed appliance comprising a dispensing passage to be connected to the mouth opening of the inner bag and a source of pressurized gas (generally air) to be connected to the vents opening(s). For reasons of compactness of the appliance, the vents design is restricted and should preferably open to the atmosphere at a location adjacent to the bag-in-container's mouth and oriented along the same axis as the latter, so as to allow all the piping to be bundled together. Such design follows the traditional beer keg interface in this regard, which is of course an advantage as it allows the replacement of a traditional keg by an integrally blow-moulded bag-in-container, without having to change the dispensing appliance.

It follows from the foregoing, that there remains a need in the art for an integrally blow-moulded bag-in-container dispense package that allows optimization of the delamination of the inner bag from the outer container upon injection of a pressurized gas at the interface thereof and, at the same time, which can be used with the existing dispensing appliances.

SUMMARY OF THE INVENTION

The present invention is defined in the appended independent claims. Preferred embodiments are defined in the dependent claims. In particular the present invention relates to an integrally blow-moulded bag-in-container having an inner layer forming the bag and an outer layer forming the container, and a mouth fluidly connecting the volume defined by the bag to the atmosphere. The container further includes at least one interface vent fluidly connecting the interface between inner and outer layers to the atmosphere, wherein the at least one vent runs parallel to the interface between inner and outer layers and opens to the atmosphere at a location adjacent to, and oriented approximately coaxially with the bag-in-container's mouth.

The present invention also concerns a preform for blow-moulding the bag-in-container of the present invention. The preform includes an inner layer and an outer layer, and a body, a neck region, and a mouth fluidly connecting the space defined by the inner layer to the atmosphere, wherein the inner and outer layers are connected to one another by an interface at least at the level of the neck region. The preform includes at least one interface vent running parallel to the interface and opening to the atmosphere at a location adjacent to, and oriented coaxially with the preform's mouth.

The inner and outer layers of the preform (and consequently of the bag-in-container) of the present invention may consist of different or the same materials. The two layers of the preform may be connected by an interface throughout substantially the whole inner surface of the outer layer. Inversely, they may be separated over a substantial area of the preform's body by a gap containing air and which is in fluid communication with at least one interface vent. The preterm may be an assembly of two separate inner and outer preforms or, alternatively, they may be an integral preform obtained by injection moulding one layer on top of the other.

The vent preferably is in the shape of a wedge with the broad side at the level of the opening thereof and getting thinner as it penetrates deeper into the vessel, until the two layers meet to form an interface. The container may comprise one or several vents evenly distributed around the lip of the bag-in-container's mouth.

One advantageous method to produce the bag-in-container of the present invention comprises the following steps:
  providing a preform as described above, wherein a gap containing air separates the inner and outer layers over a substantial area of the preform's body and wherein said gap is in fluid communication with at least one interface vent;
  bringing said preform to blow-moulding temperature;
  fixing the thus heated preform at the level of the neck region with fixing means in the blow-moulding tool;
  blow-moulding the thus heated preform to form a bag-in-container;
wherein,
  in a first stage, a gas is blown into the space defined by the inner layer to stretch the preform, whilst the air in the gap separating the preform inner and outer layers is prevented from being evacuated by closing said at least one preform interface vent with a valve located in said fixing means; and
  in a second stage, when the air pressure building up in said gap reaches a preset value, the valve opens thus allowing evacuation of the air enclosed in the gap.

A particularly preferred embodiment of the preform according to the present invention is an integral two layer preform which may be manufactured by a process comprising the following sequential steps:
  injection moulding the preform's inner layer onto a core;
  injection moulding the preform's outer layer onto the inner layer;
  extracting the thus formed preform from the core,
wherein said core is provided at the base thereof with at least one pin suitable for forming an interface vent running parallel to the interface between said first and second layers and opening to the atmosphere at a location adjacent to, and oriented coaxially with the preform's month.

DETAILED DESCRIPTION OF THE INVENTION

Figure 1A:
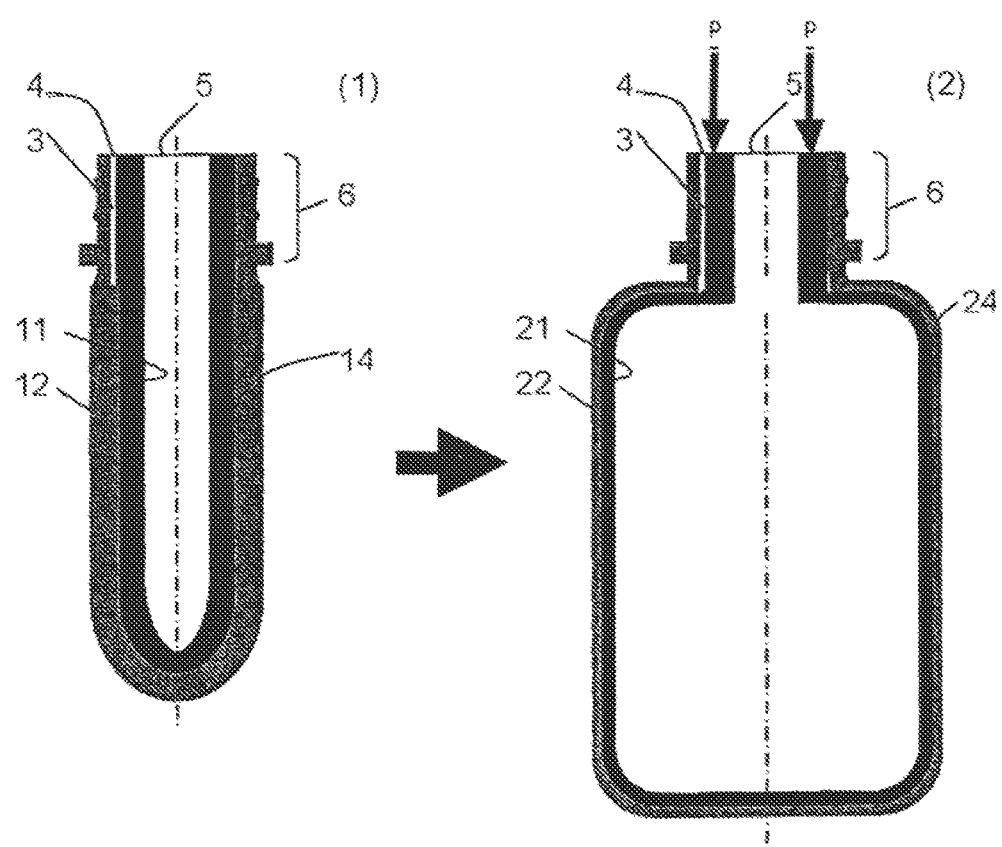
FIG. 1A is a schematic cross-sectional representation of a first embodiment of a preform according to the present invention and the bag-in-container obtained after blow-moulding thereof.
Figure 1B:
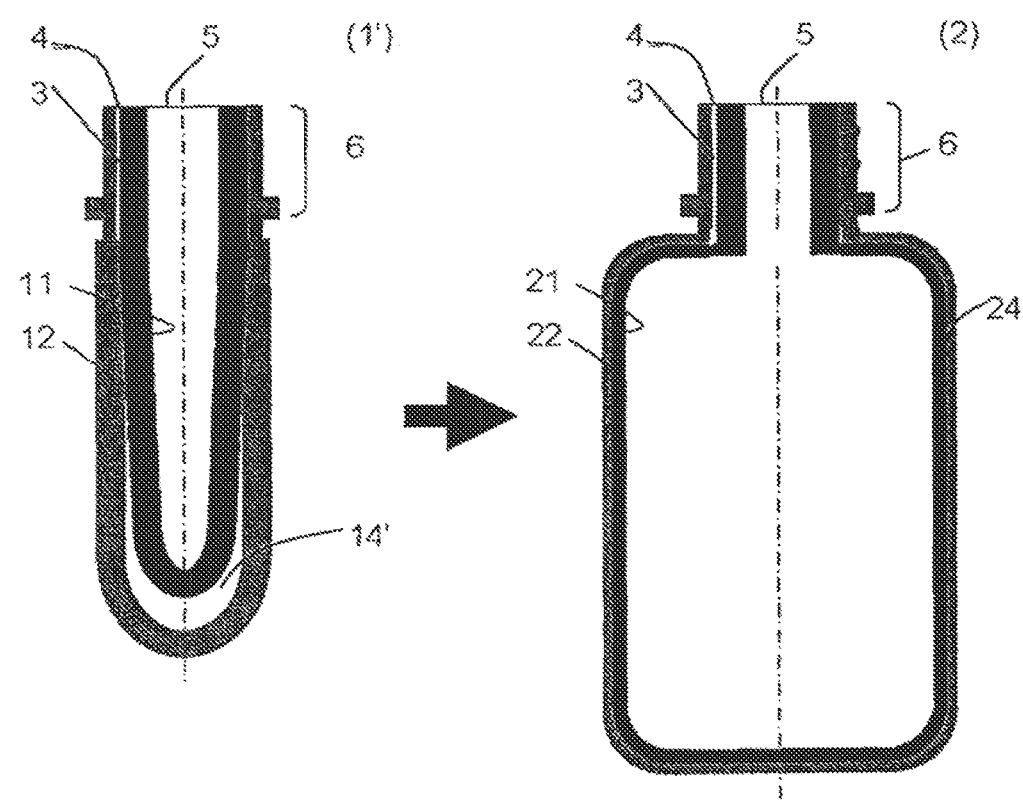
FIG. 1B is a schematic cross-sectional representation of a second embodiment of a preform according to the present invention and the bag-in-container obtained after blow-moulding thereof.

Referring now to appended FIGS. 1A and 1B, there is illustrated an integrally blow-moulded bag-in-container (2) and a preform (1) & (1') for its manufacturing. The preform (1) comprises an inner layer (11) and an outer layer (12) joined at least at the level of the neck region (6) by an interface (shown on the right hand side). The region between inner and outer layers (11) and (12) may either consist of an interface (14) wherein the two layers are substantially contacting each other, or comprise a gap (14') in fluid communication with at least one vent (3). Said vent (3) comprises an opening (4) located adjacent to, and oriented coaxially with said preform's mouth (5).

The preform may consists of an assembly of two independent preforms (11) and (12) produced independently from one another and thereafter assembled such that the inner preform (11) fits into the outer ref (12). This solution allows for greater freedom in the design of the neck and vents, as well as in the choice of materials constituting each preform component. Alternatively, it can be an integral preform obtained by injection moulding one layer on top of the other. The latter embodiment is advantageous over the assembled preform in that it comprises no assembly step and one production station only is required for the preform fabrication. On the other hand, the design of the vents in particular is restricted and the respective melting temperatures of the inner and outer layers must be carefully matched depending on which layer is injected first; the rule of thumb being that the layer being injected first generally requires a higher melting temperature.

The inner and outer layer of the preform (1) may consist of different materials or the same material. In case different materials are used, some requirements must be fulfilled depending on the process parameters in the injection moulding of the preform as well as in the blow-moulding of the bag-in-container. It is important of course that both materials may be processed in a rather similar process window and that they will not form too strong an interface which would not satisfactorily release upon injecting pressurized gas at the interface.

Alternatively and surprisingly, good results can be obtained also with preforms wherein both inner and outer layers consist of the same material. The same polymer is considered in contact on either side of the interface between the inner and outer layers in the following cases:

inner and outer layers consist of the same material (e.g., $PET_{inner}$-$PET_{outer}$, regardless of the specific grade of each PET); or the inner and outer layers consist of a blend or copolymer having at least one polymer in common, provided said polymer in common is at the interface, whilst the differing polymer is substantially absent of the interface (e.g., (0.85 PET+0.15 PA6)$_{inner}$(0.8 PET+0.2 PE)$_{outer}$.

The presence in a layer of low amounts of additives is not regarded as rendering the material different, so far as they do not alter the interface substantially.

Preferred materials for the preform and bag-in-container of the present invention are polyesters like PEF, PEN, PTT, PTN; polyamides like PA6, PA66, PA11, PA12; polyolefins like PE, PP; EVOH; biodegradable polymers like polyglycol acetate (PGAc), polylactic acid (PLA); and copolymers and blends thereof. In case different materials are used for the inner and outer layers, their optimal blow-moulding temperatures should not differ from one another by more than about 70° C., preferably 40° C., most preferably 10° C., and ideally should have the same blow-moulding temperature. The layer's temperatures may be determined by IR-measurement.

The two layers (11) and (12) of the preform may be connected by an interface (14) throughout substantially the whole inner surface of the outer layer (cf. (1) in FIG. 1A). Inversely, they may be separated over a substantial area of the preform's body by a gap (14') containing air and which is in fluid communication with at least one interface vent (3) (cf. (1') in FIG. 1B). The latter embodiment is easier to realize when using a preform assembly designed such that the inner preform is firmly fixed to the outer preform at the neck region (6) and a substantial gap (14') may thus be formed between inner and outer layers (11) and (12).

A release agent may be applied at the interface on either or both surfaces of the inner and outer layer, which are to form the interface of the bag-in-container. In the case the outer layer is injection moulded onto the inner layer, the release agent can be applied at the outer surface of the inner layer prior to moulding the outer layer. Any release agents available on the market and best adapted to the material used for the preform and resisting the blowing temperatures, like silicon- or PTFE-based release agents (e.g, Freekote) may be used. The release agent may be applied just prior to loading the preforms into the blowmoulding unit, or the preforms may be supplied pretreated.

The application of a release agent is particularly beneficial with respect to the design of the inner layer. Indeed, lowering the interferential adhesive strength facilitates delamination of the inner layer from the outer layer and hence reduces stress exerted on the inner layer upon delamination, as such the inner layer can be designed very thin and flexible without risking that the inner layer is damaged upon delamination. Clearly, the flexibility of the inner bag is a key parameter for the liquid dispensing and moreover costs savings can be achieved in terms on material savings when the inner layer can be designed very thin.

The at least one vent (3) preferably is in the shape of a wedge with the broad side at the level of the opening (4) thereof and getting thinner as it penetrates deeper into the vessel, until the two layers meet to form an interface (14) at least at the level of the neck region. The container may comprise one or several vents evenly distributed around the lip of the bag-in-container's mouth. Several vents are advantageous as they permit the interface of the inner and outer layers (21) and (22) of the bag-in-container (2) to release more evenly upon blowing pressurized gas through said vents. Preferably, the preform comprises two vents opening at the vessel's mouth lip at diametrically opposed positions. More preferably, three, and most preferably, at least four vents open at regular intervals of the mouth lip.

The wedge shape of the vent is advantageous for the release of the interface but also for the production of an integral preform. A method for producing an integral preform suitable for blow-moulding a bag-in-container according to the present invention comprises the steps of:

injection moulding the preform's inner layer onto a core;
injection moulding the preform's outer layer onto the inner layer;
extracting the thus formed preform from the core, wherein said core is provided at the base thereof with at least one pin suitable for forming an interface vent running parallel to the interface between said first and second layers and opening to the atmosphere at a location adjacent to and oriented coaxially with the preform's mouth. The core may comprise a single pin, but it preferably comprises more than one pin in order to have several vents opening around the lip of the container's mouth. The pins preferably have the shape of a wedge as on the one hand, a wedge shaped vent has the advantages discussed above and, on the other hand, it allows for easier extraction of the thus produced integral preform tarn the mouldcore. The dimensions of the pins depend on the size of the bag-in-container and, in particular, of the mouth and lip thereof. For a typical home beverage dispenser of a capacity of about 56 liters, the pins have a length of about 5 to 75 mm, preferably 5 to 50 mm, most preferably 10 to 20 mm and their base, forming the vents openings, preferably are in the shape of an arc section of length comprised between 3 and 15 mm, preferably 5 and 10 mm and of width comprised between 0.5 and 5 mm, preferably 0.5 and 2 mm.

The bag-in-container (2) of the present invention can be obtained by providing a preform as described above; bringing said preform to blow-moulding temperature; fixing the thus heated preform at the level of the neck region with fixing means in the blow-moulding tool; and blow-moulding the thus heated preform to form a bag-in-container. The inner and outer layers (21) and (22) of the thus obtained bag-in-container are connected to one another by an interface (24) over substantially the whole of the inner surface of the outer layer. Said interface (24) is in fluid communication with the atmosphere through the vents (3), which maintained their original geometry through the blow-moulding process since the neck region of the preform where the vents are located is held firm by the fixing means and is not stretched substantially during blowing.

It is essential that the interface (24) between inner and outer layers (21) and (22) releases upon blowing pressurized gas through the vents in as consistent and reproducible manner. The success of said operation depends on a number of parameters, in particular, on the interfacial adhesive strength, the number, geometry, and distribution of the vents, and on the pressure of the gas injected. The interfacial strength is of course a key issue and can be modulated by the choice of materials for the inner and outer layers, and by the process parameters during blow-moulding. The pressure-time-temperature window used is of course of prime importance, but it has surprisingly been discovered that excellent results can be obtained if the blow-moulding process is carried out on a preform as described above, of the type wherein. a gap containing air separates the inner and outer layers over a substantial area of the preform's body and wherein said gap is in fluid communication with at least one interface vent and wherein, in a first stage, a gas is blown into the space defined by the inner layer to stretch the preform, whilst the air in the gap separating the preform inner and outer layers is prevented from being evacuated by closing said at least one preform interface vent with a valve located in the fixing means; and in a second stage, when the air pressure building up in said gap reaches a preset value, the valve opens thus allowing evacuation of the air enclosed in the gap.

By this method, the inner layer is prevented from entering into contact with the outer layer by the air cushion enclosed within the gap separating the two layers when their respective temperatures are the highest. As stretching proceeds, the gap becomes thinner and air pressure within the gap increases. When the pressure reaches a preset value, the valve closing the vent opening releases, the air is ejected, and the inner layer is permitted to contact the outer layer and form an interface therewith at a stage where their respective temperatures have dropped to a level where adhesion between the layers cannot build up to any substantial level.

Alternatively or additionally, it is preferred to apply a (mechanical) pressure on the neck region of the inner layer in a direction as indicated by the arrows P in FIG. 1A after or during blow moulding. It has surprisingly been found that the application of such pressure facilitates release of the interface during the blow-moulding operation, hence further release upon blowing pressurized gas through the vents. Indeed, the application of such pressure on the neck portion of the inner layer allows to induce an spacing between the inner and outer layers at the shoulder portion of the bag-in-container, which spacing facilitates further delamination of the inner and outer layers upon blowing pressurized gas through the above mentioned vents.

A preform according to the present invention was produced by injecting a melt into a first mould cavity cooled at a temperature of $T\_mould$ ° C., to form the preform's inner layer (11). A melt was injected into a second mould cavity cooled to form the preform's outer layer (12). The two preform components were assembled to form a preform according to the present invention.

The preform produced as explained above was heated in an oven comprising an array of IR lamps and then fixed into a blow-moulding mould which walls were maintained at a desired temperature. Air was blown into the preform under pressure. The thus produced bag-in-container was they filled with a liquid and connected to an appliance for dispensing beverage comprising a source of compressed air in order to determine the delamination pressure.

The delamination pressure was determined as follows. The interface vents of said bag-in-container were connected to the source of compressed air. Air was injected through the vents at a constant pressure, and the interface between inner and outer layers was observed. The pressure was increased stepwise until delamination pressure was reached. Delamination pressure is defined as the pressure at which the inner bag separates from the outer layer over the whole of their interface and collapses. The surfaces of the thus separated layers were examined for traces of bonding.

The delamination pressure of the bag-in-container described above was of about 05±0.1 bar overpressure and showed little trace of cohesive fracture between the inner and outer layers. This example demonstrates that bag-in-containers of excellent quality can be produced with integral preforms according to the present invention.

The invention claimed is:

1. A method for manufacturing a preform, having an integral preform obtained by injection moulding one layer on top of the other comprising the following steps: injection moulding a preform's inner layer onto a core; injection moulding a preform's outer layer onto the inner layer; and extracting the thus formed preform from the core; wherein said core is provided at a base thereof with at least one pin suitable for forming an interface vent running parallel to the interface between said first and second layers and opening to the atmosphere at a location adjacent to, and oriented approximately coaxially with a preform's mouth.

2. The method according to claim 1, wherein the at least one pin is in the shape of a wedge with the broad side at the level of where it is connected to the core's base.

3. The method according to claim 1, wherein more than one pin is distributed around the core.

* * * * *